US012566817B2

(12) United States Patent
Perkins

(10) Patent No.: US 12,566,817 B2
(45) Date of Patent: Mar. 3, 2026

(54) AUTOMATIC MACHINE LEARNING MODEL EVALUATION

(71) Applicant: Verizon Media Inc., New York, NY (US)

(72) Inventor: Kevin Andrew Perkins, Champaign, IL (US)

(73) Assignee: Yahoo Assets LLC, New York, NY (US)

( * ) Notice: Subject to any disclaimer, the term of this patent is extended or adjusted under 35 U.S.C. 154(b) by 1350 days.

(21) Appl. No.: 17/168,227

(22) Filed: Feb. 5, 2021

(65) Prior Publication Data

US 2022/0253647 A1 Aug. 11, 2022

(51) Int. Cl.
*G06F 18/214* (2023.01)
*G06F 11/30* (2006.01)
*G06F 18/21* (2023.01)
*G06N 20/20* (2019.01)

(52) U.S. Cl.
CPC ...... *G06F 18/2148* (2023.01); *G06F 11/3086* (2013.01); *G06F 18/2185* (2023.01); *G06N 20/20* (2019.01)

(58) Field of Classification Search
CPC ............. G06F 18/2148; G06F 11/3086; G06F 18/2185; G06N 20/20; G06N 3/045; G06N 5/01; G06N 7/01
See application file for complete search history.

(56) References Cited

U.S. PATENT DOCUMENTS

| | | | | |
|---|---|---|---|---|
| 6,259,448 B1* | 7/2001 | McNally | ............... | G06F 3/0486 |
| | | | | 715/969 |
| 2019/0294927 A1* | 9/2019 | Guttmann | ............. | G10L 15/065 |
| 2021/0150412 A1* | 5/2021 | Rashidi | .................. | G06N 20/00 |
| 2021/0232980 A1* | 7/2021 | Velagapudi | ........... | G06F 18/217 |
| 2022/0036128 A1* | 2/2022 | Levanony | ............... | G06F 18/24 |
| 2023/0409647 A1* | 12/2023 | Fleming | ................. | G06N 20/00 |

* cited by examiner

*Primary Examiner* — Abdullah Al Kawsar
*Assistant Examiner* — Tewodros E Mengistu
(74) *Attorney, Agent, or Firm* — Cooper Legal Group LLC

(57) ABSTRACT

One or more computing devices, systems, and/or methods are provided. Machine learning model training may be performed using first training data to generate a first machine learning model. Inference-training data may be generated, wherein the inference-training data may include a plurality of sets of training data of the first training data, a plurality of sets of inference data, and/or target information indicative of the plurality of sets of training data being associated with a first classification and the plurality of sets of inference data being associated with a second classification. Machine learning model training may be performed using the inference-training data to generate a second machine learning model. Predictions associated with one or more sets of data may be determined using the second machine learning model. An evaluation of the first machine learning model and the one or more sets of data may be generated based upon the predictions.

20 Claims, 11 Drawing Sheets

501 ⟶

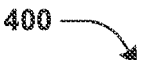

400

PERFORM MACHINE LEARNING MODEL TRAINING USING FIRST TRAINING DATA TO GENERATE FIRST MACHINE LEARNING MODEL, WHEREIN FIRST TRAINING DATA COMPRISES FIRST PLURALITY OF SETS OF TRAINING DATA — 402

IDENTIFY FIRST PLURALITY OF SETS OF INFERENCE DATA — 404

GENERATE, BASED UPON FIRST TRAINING DATA AND FIRST PLURALITY OF SETS OF INFERENCE DATA, FIRST INFERENCE-TRAINING DATA — 406

PERFORM MACHINE LEARNING MODEL TRAINING USING FIRST INFERENCE-TRAINING DATA TO GENERATE SECOND MACHINE LEARNING MODEL — 408

DETERMINE, USING SECOND MACHINE LEARNING MODEL, ONE OR MORE FIRST PREDICTIONS ASSOCIATED WITH ONE OR MORE FIRST SETS OF DATA, WHEREIN FIRST PREDICTION OF ONE OR MORE FIRST PREDICTIONS IS PREDICTION OF WHETHER FIRST SET OF DATA OF ONE OR MORE FIRST SETS OF DATA IS PART OF FIRST TRAINING DATA — 410

GENERATE, BASED UPON ONE OR MORE FIRST PREDICTIONS, EVALUATION OF FIRST MACHINE LEARNING MODEL AND/OR ONE OR MORE FIRST SETS OF DATA — 412

FIG. 4

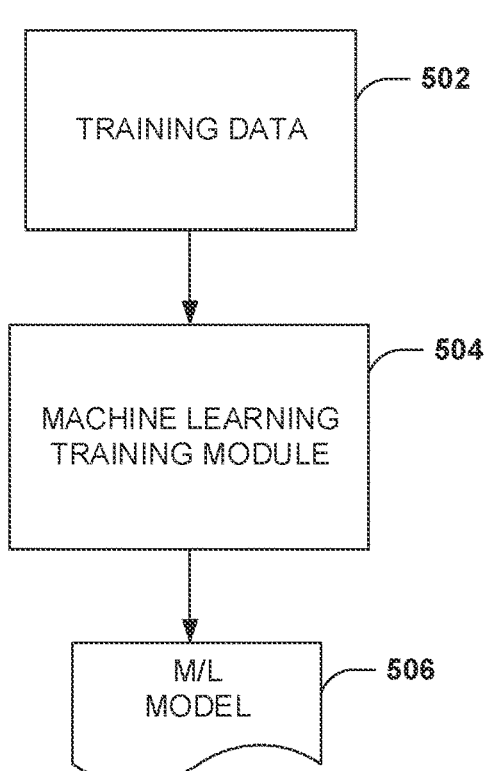
FIG. 5A

501
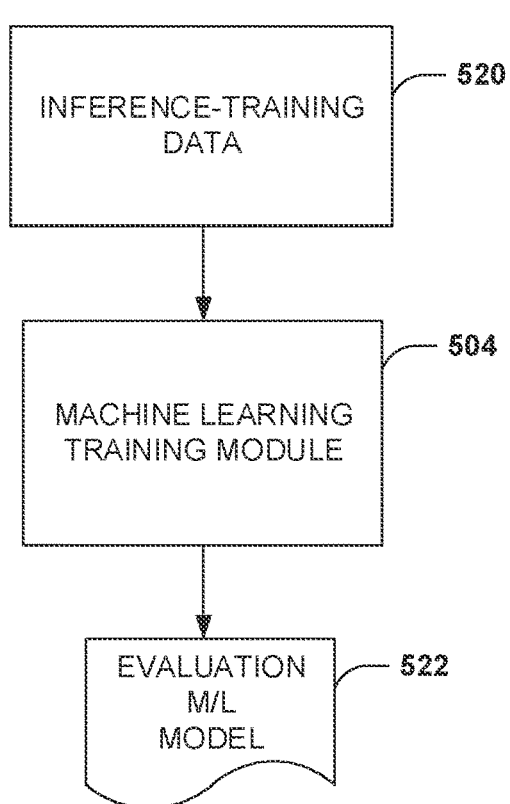
INFERENCE-TRAINING
DATA — 520
MACHINE LEARNING
TRAINING MODULE — 504
EVALUATION
M/L
MODEL — 522
FIG. 5C

501
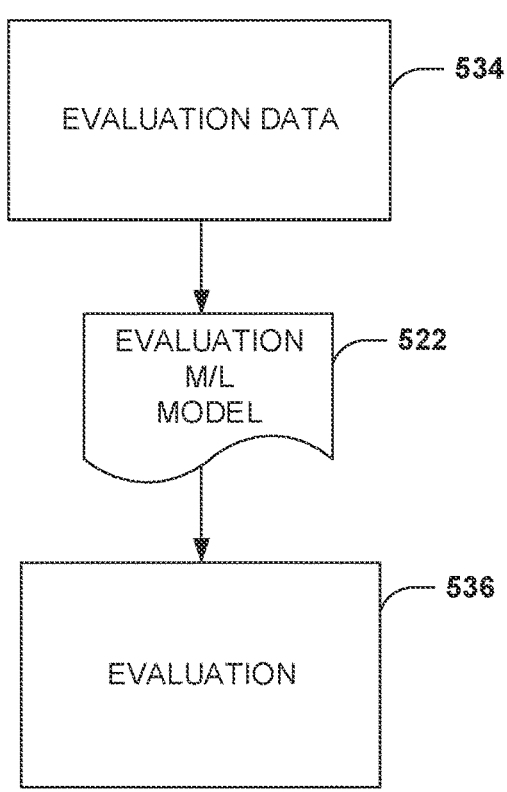
534
EVALUATION DATA
522
EVALUATION
M/L
MODEL
536
EVALUATION
FIG. 5E

501 ⟍

550 ⟍

548 ⟍

EVALUATION REPORT

Inference Data is incompatible with M/L Model.

Differences

• Color of object of inference data is red while color of objects of training data are yellow or orange.

• Aspect ratio of image of inference data is 1:2 while aspect ratio of images of training data is 1:1.

• Image of inference data is darker than images of training data.

Train Machine Learning Model Using Inference Data ⟋ 552

Remove Prediction(s) Associated With Incompatible Inference Data ⟋ 554

Flag Prediction(s) Associated With Incompatible Inference Data ⟋ 556

FIG. 5F

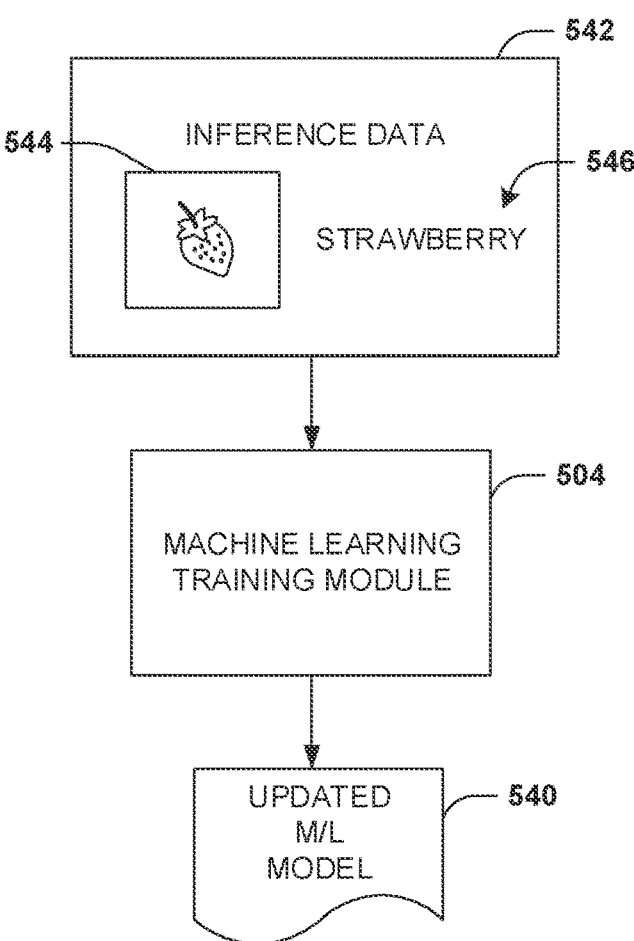
FIG. 5G

AUTOMATIC MACHINE LEARNING MODEL EVALUATION

BACKGROUND

Many systems use machine learning models, such as neural network machine learning models, tree based machine learning models, etc., to perform classification, regression, clustering, etc. However, some machine learning models may produce unreliable results which may go undetected for a large period of time.

SUMMARY

In accordance with the present disclosure, one or more computing devices and/or methods are provided. In an example, machine learning model training using first training data may be performed to generate a first machine learning model. The first training data may comprise a first plurality of sets of training data and a first plurality of labels associated with the first plurality of sets of training data. A first plurality of sets of inference data, based upon which the first machine learning model is configured to determine information, may be identified. First inference-training data, comprising a second plurality of sets of data and a second plurality of labels, may be generated based upon the first training data and the first plurality of sets of inference data. The second plurality of sets of data may comprise a second plurality of sets of training data of the first plurality of sets of training data and/or a second plurality of sets of inference data of the first plurality of sets of inference data. The second plurality of labels may comprise a third plurality of labels associated with the second plurality of sets of training data and/or a fourth plurality of labels associated with the second plurality of sets of inference data. The third plurality of labels may correspond to a first classification and/or the fourth plurality of labels may correspond to a second classification. Machine learning model training using the first inference-training data may be performed to generate a second machine learning model. One or more first predictions associated with one or more first sets of data may be determined using the second machine learning model. A first prediction of the one or more first predictions is a prediction of whether a first set of data of the one or more first sets of data is part of the first training data. An evaluation of the first machine learning model and the one or more first sets of data may be generated based upon the one or more first predictions.

In an example, machine learning model training using first training data may be performed to generate a first machine learning model. The first training data may comprise a first plurality of sets of training data. A first plurality of sets of inference data may be identified. First inference-training data, comprising a second plurality of sets of data and target information, may be generated based upon the first training data and the first plurality of sets of inference data. The second plurality of sets of data may comprise a second plurality of sets of training data of the first plurality of sets of training data and/or a second plurality of sets of inference data of the first plurality of sets of inference data. The target information may be indicative of the second plurality of sets of training data being associated with a first classification and the second plurality of sets of inference data being associated with a second classification. Machine learning model training using the first inference-training data may be performed to generate a second machine learning model. One or more first predictions associated with one or more first sets of data may be determined using the second machine learning model. A first prediction of the one or more first predictions may be a prediction of whether a first set of data of the one or more first sets of data is part of the first training data. An evaluation of the first machine learning model and the one or more first sets of data may be generated based upon the one or more first predictions.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 4 is a flow chart illustrating an example method for evaluating machine learning models and/or inference data.

FIG. 5A is a component block diagram illustrating an example system for evaluating machine learning models and/or inference data, where a machine learning training module performs machine learning model training to generate a first machine learning model.

FIG. 5C is a component block diagram illustrating an example system for evaluating machine learning models and/or inference data, where a machine learning training module performs machine learning model training to generate a second machine learning model.

FIG. 5E is a component block diagram illustrating an example system for evaluating machine learning models and/or inference data, where an evaluation is generated using a second machine learning model.

FIG. 5F is a component block diagram illustrating an example system for evaluating machine learning models and/or inference data, where a machine learning model management interface is displayed.

FIG. 5G is a component block diagram illustrating an example system for evaluating machine learning models and/or inference data, where machine learning model training is performed to generate a third machine learning model.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
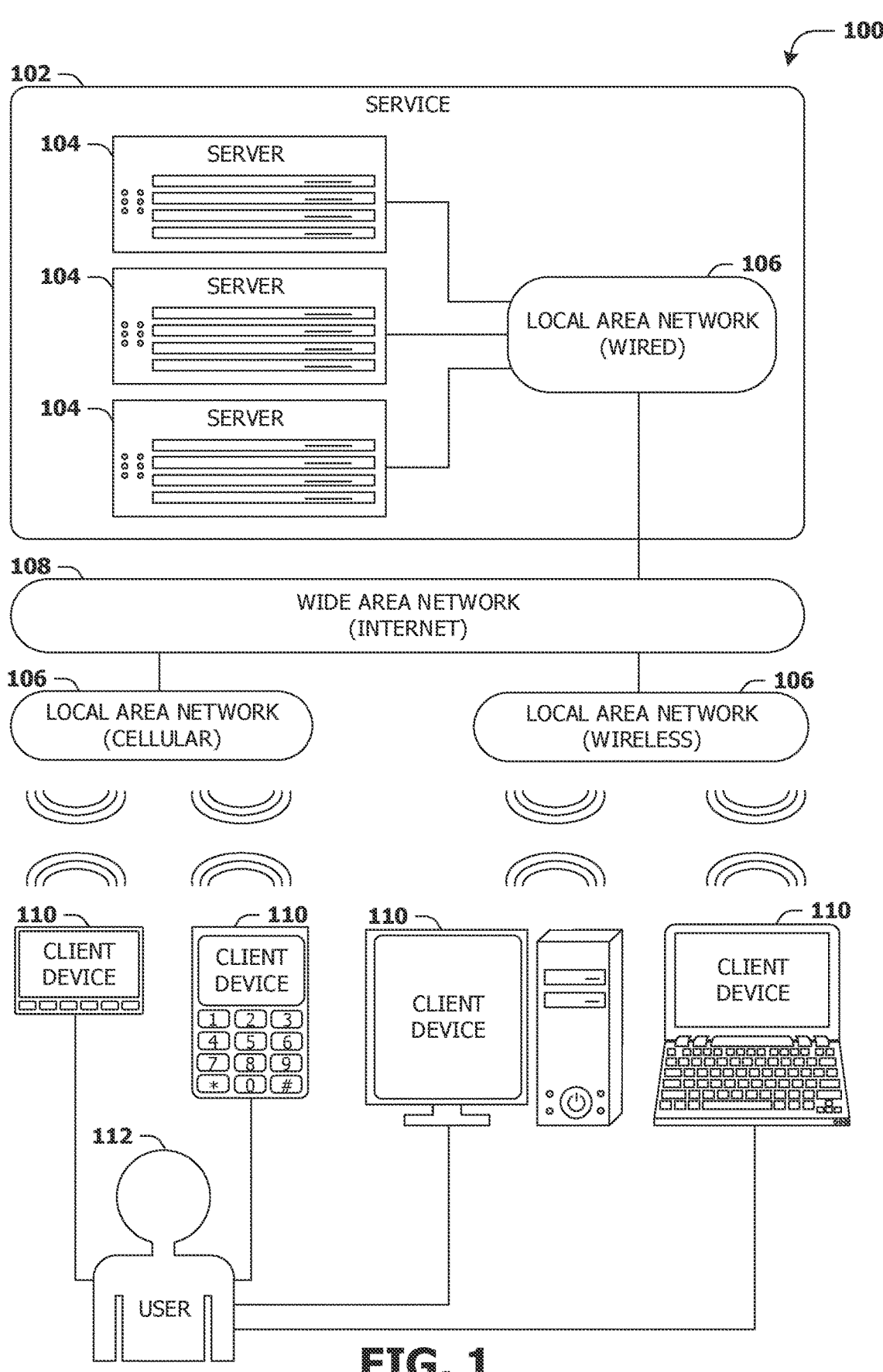
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figures 2, 3:
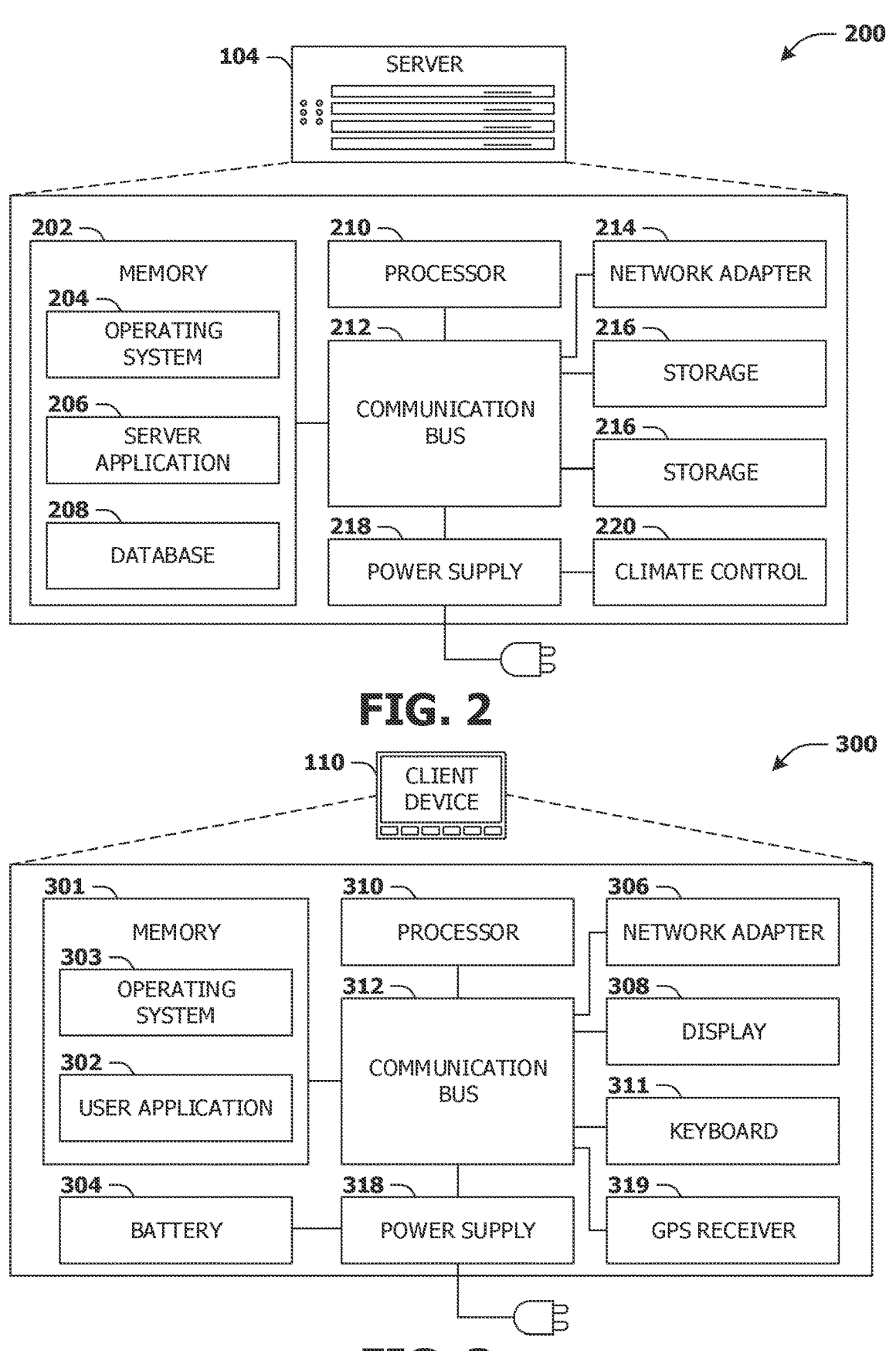
FIG. 2 is an illustration of a scenario involving an example configuration of a server that may utilize and/or implement at least a portion of the techniques presented herein.
FIG. 3 is an illustration of a scenario involving an example configuration of a client that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for evaluating machine learning models and/or inference data are provided. A system may use a machine learning model to perform one or more actions, such as at least one of one or more classification actions, one or more regression actions, one or more clustering actions, etc. For example, the system may use the machine learning model to output information (e.g., one or more predictions) based upon one or more inputs. The information may be used to provide one or more services (e.g., the information may be used to at least one of select content for presentation to a user, to classify data such as an image, etc.). The one or more inputs may correspond to one or more sets of inference data, for which target information (e.g., target labels) may not be available. In some examples, the machine learning model may be incompatible with a set of inference data (such as due to at least one of a bug in generating the set of inference data, the set of inference data being processed using an incorrect encoder, model drift associated with the machine learning model over time, etc.). In some systems, the machine learning model and/or one or more sets of inference data may be reviewed manually to evaluate the machine learning model and/or the one or more sets of inference data and/or to determine whether the one or more sets of infer- ence data are compatible with the machine learning model. Some systems require human input (e.g., labels for the one or more sets of inference data) in order to evaluate the machine learning model and/or one or more sets of inference data. Relying upon manual effort (e.g., manually reviewing the machine learning model and/or the one or more sets of inference data) and/or human input (e.g., labels for the one or more sets of inference data) to evaluate the machine learning model and/or the one or more sets of inference data may be costly and/or inefficient.

Thus, in accordance with one or more of the techniques herein, first inference-training data, comprising a first plu- rality of sets of data and target information, may be gener- ated based upon a first plurality of sets of inference data and first training data used to train the machine learning model. The first plurality of sets of data may comprise a first plurality of sets of training data of the first training data and/or the first plurality of sets of inference data. The target information may be indicative of the first plurality of sets of training data being associated with a first classification (e.g., the first classification may correspond to training data) and the first plurality of sets of inference data being associated with a second classification (e.g., the second classification may correspond to inference data). Machine learning model training using the first inference-training data may be per- formed to generate a second machine learning model. One or more first predictions associated with one or more sets of data may be determined using the second machine learning model. A prediction of the one or more first predictions may be a prediction of whether a set of data of the one or more sets of data is part of the first training data. An evaluation of the machine learning model and the one or more sets of data may be generated based upon the one or more predictions. For example, the evaluation may be indicative of whether a set of data of the one or more sets of data is compatible with the machine learning model.

An embodiment of evaluating machine learning models and/or inference data is illustrated by an example method 400 of FIG. 4. A system may use one or more machine learning models to perform one or more actions, such as at least one of one or more classification actions, one or more regression actions, one or more clustering actions, etc. For example, the system may use the one or more machine learning models to output information based upon one or more inputs and/or use the information to provide one or more services.

At 402, machine learning model training may be per- formed using first training data to generate a first machine learning model. In some examples, the first machine learn- ing model may comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (kNN) model, a K-Means model, a random forest model, a machine learning model used to perform dimen- sional reduction, a machine learning model used to perform gradient boosting, etc.

Figure 5B:
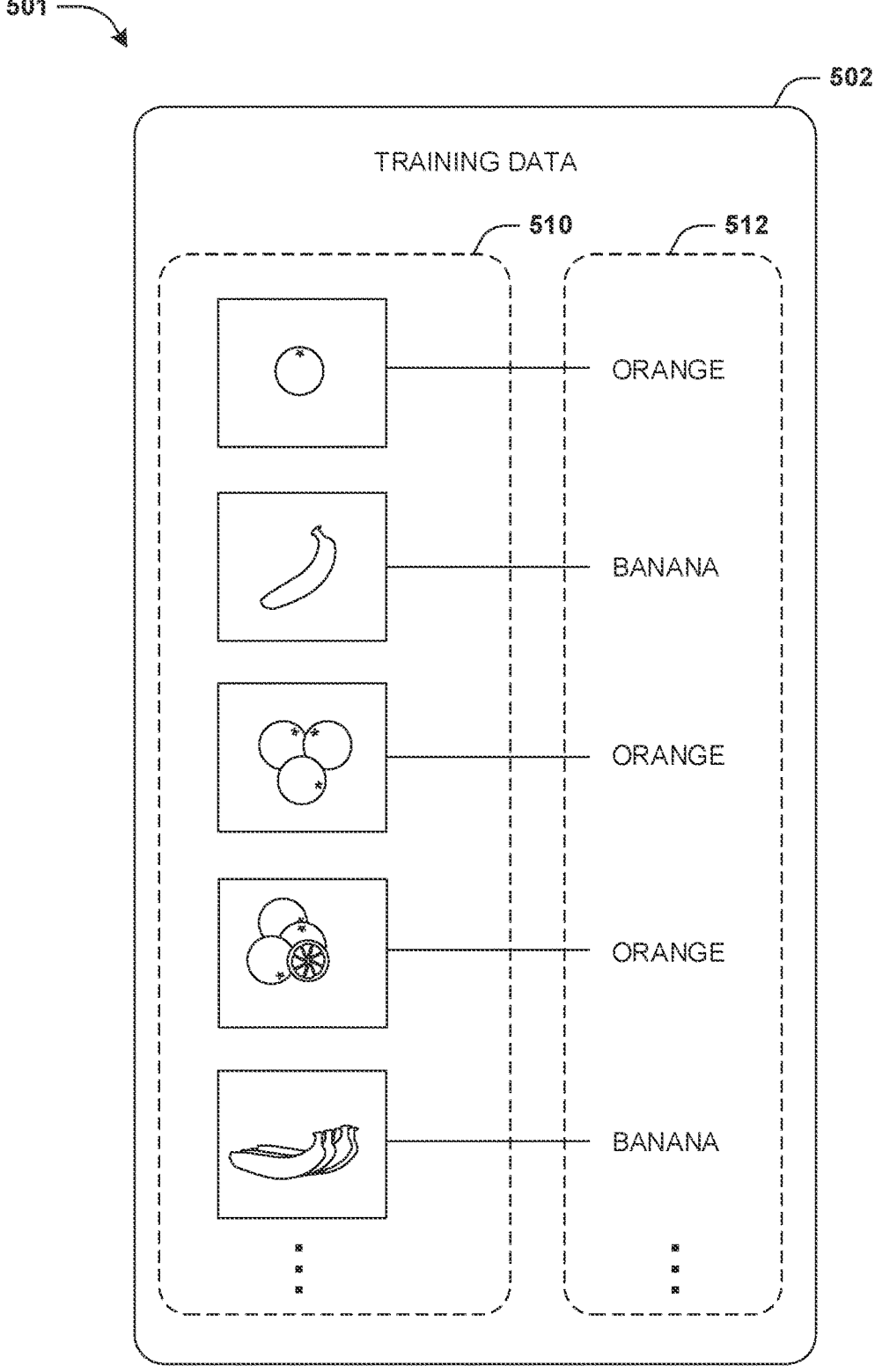
FIG. 5B is a component block diagram illustrating example training data of an example system for evaluating machine learning models and/or inference data.

FIGS. 5A-5G illustrate examples of a system 501 for evaluating machine learning models and/or inference data, described with respect to the method 400 of FIG. 4. FIG. 5A illustrates a machine learning training module 504 performing machine learning model training to generate the first machine learning model (shown with reference number 506 in FIG. 5A). In an example, the first training data (shown with reference number 502 in FIG. 5A) may be input to the machine learning training module 504. The machine learn- ing training module 504 may generate the first machine learning model 506 using the first training data 502.

In some examples, the first training data 502 may com- prise a first plurality of sets of training data. In an example, a set of training data of the first plurality of sets of training data may comprise at least one of an image, one or more characters (e.g., one or more numbers, symbols and/or text, such as encoded text), structured data, etc.

In some examples, the first training data 502 may com- prise first target information (e.g., target attributes associated with the first plurality of sets of training data). For example, the first target information may comprise a first plurality of labels associated with the first plurality of sets of training data. In some examples, the first plurality of labels may be indicative of classifications associated with sets of training data of the first plurality of sets of training data. For example, a label of the first plurality of labels may be indicative of a classification of a set of training data of the first plurality of sets of training data.

FIG. 5B illustrates an example of the first training data 502. In the example of FIG. 5B, the first machine learning model 506 may be trained and/or configured to determine whether an image corresponds to a banana or an orange. For example, the first machine learning model 506 may be trained and/or configured to predict, based upon a set of data (e.g., an image), a classification (e.g., a fruit classification) corresponding to the set of data. The first plurality of sets of training data (shown with reference number 510 in FIG. 5B) may comprise images of bananas and/or oranges. The first target information (shown with reference number 512 in FIG. 5B) may comprise labels associated with images of the first plurality of sets of training data 512. In an example, a label of the first target information 512 may be indicative of a classification of an image, such as banana or orange.

At 404, a first plurality of sets of inference data is identified. In some examples, the first machine learning model 506 is configured to determine (e.g., predict) infor- mation based upon the first plurality of sets of inference data. In some examples, the first plurality of sets of inference data may comprise one or more sets of data corresponding to testing data used for testing and/or validation of the first machine learning model 506. Alternatively and/or addition- ally, the first plurality of sets of inference data may comprise one or more sets of data to be input to the first machine learning model 506 to determine information associated with the one or more sets of data. For example, one or more actions may be performed and/or one or more services may be provided based upon the information determined using the first machine learning model 506 based upon the one or more sets of data. In an example, one or more sets of inference data of the first plurality of sets of inference data may be at least one of retrieved, processed, generated, etc. such that the first machine learning model 506 can determine information based upon the one or more sets of data. In some examples, target information associated with the first plu- rality of sets of inference data may not be available.

In an example, a set of inference data of the first plurality of sets of inference data may be associated with a user and/or a device (e.g., a client device). For example, the set of inference data may be generated based upon a user profile associated with the user and/or the device. Alternatively and/or additionally, the set of inference data may comprise structured data indicative of one or more features associated with the user and/or the device. The one or more features may comprise at least one of one or more features corresponding to activity of the device, one or more features corresponding to one or more demographic parameters of the user, one or more features corresponding to one or more content items consumed via the device, one or more features corresponding to one or more internet resources accessed via the device, etc. In some examples, information of the user profile (and/or other information associated with the user and/or the device) may be processed, such as in a feature engineering pipeline, to generate the set of inference data. The first machine learning model 506 may be configured to determine information based upon the set of inference data. A system may use the information determined based upon the set of inference data to perform one or more actions and/or provide one or more services (such as to the user and/or the device). In an example, the determined information may comprise a determination of whether the user is interested in a content item, a probability that the user is interested in a content item, a probability that the user selects (e.g., clicks) a content item in response to presenting the content item via the device, etc. In an example, a content item may be selected based upon the determined information and/or the content item may be presented and/or recommended via the device based upon the selection.

In an example, the first plurality of sets of inference data may comprise sets of inference data associated with a set of entities (e.g., at least one of a set of users, a set of devices a set of internet resources, a set of companies, etc.). For example, the sets of inference data may be generated based upon profiles associated with the set of entities. Alternatively and/or additionally, the sets of inference data may comprise structured data indicative of features associated with the set of entities. The features may comprise at least one of features corresponding to demographic parameters of the set of entities, features corresponding to attributes of the set of entities, features corresponding to content items consumed by the set of entities, features corresponding to internet resources accessed by set of entities, etc. In some examples, information of the profiles (and/or other information associated with the set of entities) may be processed, such as in a feature engineering pipeline, to generate the sets of inference data. The first machine learning model 506 may be configured to determine information based upon the sets of inference data. For example, the first machine learning model 506 may be configured to cluster the set of entities into groups of entities. A system may use the information (e.g., the groups of entities) determined based upon the sets of inference data to perform one or more actions and/or provide one or more services. In an example, a content item may be recommended and/or presented to an entity of a group of entities based upon a determination that one or more other entities of the group of entities at least one of selected the content item, is interested in the content item, etc.

In an example, the first plurality of sets of inference data may comprise a set of inference data corresponding to encoded text. For example, the set of inference data may be generated based upon text (e.g., text of an article, a transcript of a video, a transcript of audio, a transcript of speech recorded using a microphone, etc.). In some examples, the text may be processed, such as in a feature engineering pipeline, to generate the set of inference data. For example, processing of the text may comprise encoding the text using an encoder. The first machine learning model 506 may be configured to determine information based upon the set of inference data, such as using one or more natural language processing techniques. A system may use the information determined based upon the set of inference data to perform one or more actions and/or provide one or more services. In an example, the determined information may identify one or more summarizing sections (e.g., one or more phrases and/or sentences of the text that summarize and/or comprise main points of an article, for example). A summary of the text may be generated to include the one or more summarizing sections based upon the determined information. The summary of the text may be displayed via one or more client devices. Alternatively and/or additionally, the determined information may identify one or more operations to be performed based upon the text (such as in an example in which the text comprises one or more commands recorded via a microphone using a virtual assistant). For example, the one or more operations may be performed based upon the determined information.

At 406, first inference-training data may be generated based upon the first training data 502 and the first plurality of sets of inference data. For example, at least some of the first training data 502 and/or at least some of the first plurality of sets of inference data may be included in the first inference-training data. In some examples, the first inference-training data may comprise a second plurality of sets of data and/or second target information. The second plurality of sets of data may comprise a second plurality of sets of inference data and/or a second plurality of sets of training data.

In some examples, the second plurality of sets of inference data may comprise the first plurality of sets of inference data. Alternatively and/or additionally, the second plurality of sets of inference data may comprise a subset of the first plurality of sets of inference data. For example, the second plurality of sets of inference data may be selected, from the first plurality of sets of inference data, for inclusion in the first inference-training data. In some examples, the second plurality of sets of inference data may be randomly selected from the first plurality of sets of inference data (using one or more random sampling techniques, for example). In some examples, the second plurality of sets of inference data may be selected based upon a target quantity of sets of inference data for inclusion in the first inference-training data. For example, a quantity of sets of inference data of the second plurality of sets of inference data may be equal to the target quantity of sets of inference data.

In some examples, the second plurality of sets of training data may comprise the first plurality of sets of training data. Alternatively and/or additionally, the second plurality of sets of training data may comprise a subset of the first plurality of sets of training data. For example, the second plurality of sets of training data may be selected, from the first plurality of sets of training data, for inclusion in the first inference-training data. In some examples, the second plurality of sets of training data may be randomly selected from the first plurality of sets of training data (using one or more random sampling techniques, for example). In some examples, the second plurality of sets of training data may be selected based upon a target quantity of sets of training data for inclusion in the first inference-training data. For example, a quantity of sets of training data of the second plurality of sets of training data may be equal to the target quantity of sets of training data.

In some examples, the second target information may be indicative of the second plurality of sets of training data being associated with a first classification (e.g., the first classification may correspond to training data used for training and/or generating the first machine learning model 506) and/or the second plurality of sets of inference data being associated with a second classification (e.g., the second classification may correspond to inference data not used for training and/or generating the first machine learning model 506). For example, the second target information may comprise a second plurality of labels associated with sets of data of the second plurality of sets of data. In some examples, the second plurality of labels may comprise a third plurality of labels associated with the second plurality of sets of training data. In an example, the third plurality of labels may correspond to the first classification. Alternatively and/or additionally, the second plurality of labels may comprise a fourth plurality of labels associated with the second plurality of sets of inference data. In an example, the fourth plurality of labels may correspond to the second classification.

At 408, machine learning model training may be performed using the first inference-training data to generate a second machine learning model. In some examples, the second machine learning model may be trained and/or configured for predicting whether a set of data is part of the first training data 502 (or part of the first plurality of sets of inference data). Alternatively and/or additionally, the second machine learning model may be trained and/or configured to predict whether the set of data corresponds to the first classification or the second classification (e.g., the second machine learning model may be trained and/or configured to predict a class label of a set of data). Alternatively and/or additionally, the second machine learning model may be trained and/or configured to differentiate between sets of data corresponding to the first classification (e.g., data that may be part of the first training data 502 used to train the first machine learning model 506) and/or sets of data corresponding to the second classification (e.g., data that may be part of the first plurality of sets of inference data and/or data that may not be part of the first training data 502).

FIG. 5C illustrates the machine learning training module 504 performing machine learning model training to generate the second machine learning model (shown with reference number 522 in FIG. 5C). In an example, the first inference-training data (shown with reference number 520 in FIG. 5C) may be input to the machine learning training module 504 (and/or a second machine learning training module other than the machine learning training module 504). The machine learning training module 504 (and/or the second machine learning training module) may generate the second machine learning model 522 (labeled "EVALUATION M/L MODEL" in FIG. 5C).

Figure 5D:
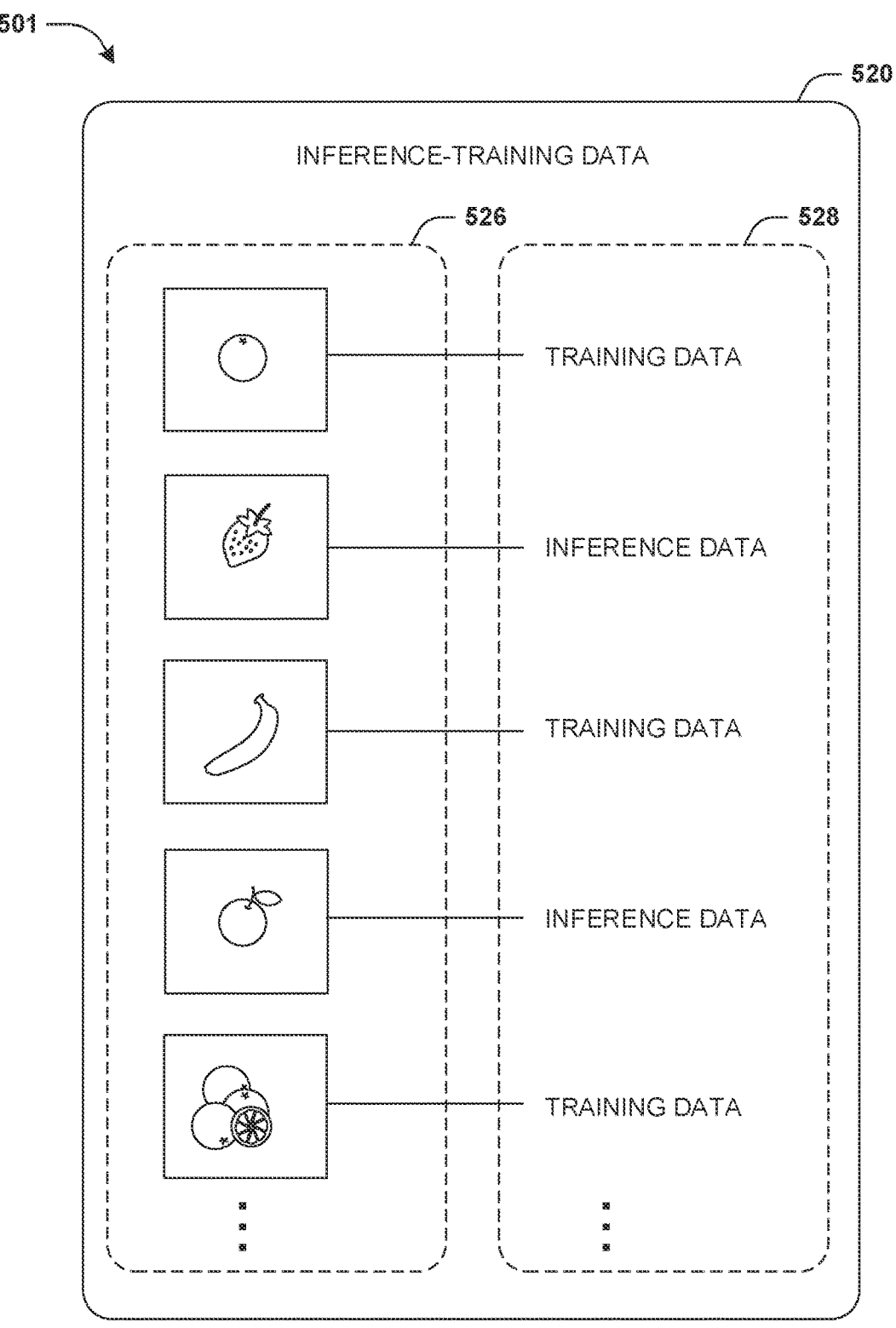
FIG. 5D is a component block diagram illustrating example inference-training data of an example system for evaluating machine learning models and/or inference data.

FIG. 5D illustrates an example of the first inference-training data 520. The second target information (shown with reference number 528 in FIG. 5D) may be indicative of classifications of sets of data of the second plurality of sets of data (shown with reference number 526 in FIG. 5D). For example, the second target information 528 may indicate that sets of data of the second plurality of sets of training data are associated with the first classification (e.g., training data) and/or that sets of data of the second plurality of sets of inference data are associated with the second classification (e.g., inference data).

At 410, the one or more first predictions associated with evaluation data may be determined using the second machine learning model 522. In some examples, the evaluation data may comprise one or more first sets of data. In an example, the one or more first sets of data may comprise one or more sets of inference data (of the first plurality of sets of inference data, for example) and/or one or more sets of training data (of the first plurality of sets of training data, for example).

In some examples, one or more first sets of inference data may be selected, from the first plurality of sets of inference data, for inclusion in the evaluation data. In an example, the one or more first sets of inference data may be separate from the second plurality of sets of inference data (e.g., the second plurality of sets of inference data included in the first inference-training data 520 may not comprise a set of inference data of the one or more first sets of inference data).

Alternatively and/or additionally, one or more first sets of training data may be selected, from the first plurality of sets of training data, for inclusion in the evaluation data. In an example, the one or more first sets of training data may be separate from the second plurality of sets of training data (e.g., the second plurality of sets of training data included in the first inference-training data 520 may not comprise a set of training data of the one or more first sets of training data).

In some examples, a first prediction of the one or more first predictions is a prediction of a classification (e.g., the first classification or the second classification) of a first set of data of the one or more first sets of data. For example, the first prediction may be a prediction of whether the first set of data is part of the first training data 502. The first prediction may comprise a first label (e.g., a class label) indicative of the first classification (associated with training data, for example) or the second classification (associated with inference data, for example). Alternatively and/or additionally, the first prediction may comprise a first confidence score associated with the first prediction and/or the first label.

At 412, an evaluation of the first machine learning model 506 and/or the evaluation data (comprising the one or more first sets of data) may be generated based upon the one or more first predictions. In some examples, the evaluation may be indicative of whether one or more sets of inference data are compatible with the first machine learning model 506. Alternatively and/or additionally, the evaluation may be indicative of whether there is a difference in data between the first training data 502 used to generate the first machine learning model 506 and inference data (e.g., one or more sets of inference data of the evaluation data and/or one or more sets of inference data of the first plurality of sets of inference data, for example) based upon which the first machine learning model 506 is configured to determine (e.g., predict) information.

FIG. 5E illustrates the evaluation (shown with reference number 536 in FIG. 5E) being generated using the second machine learning model 522. In some examples, the evaluation data (shown with reference number 534 in FIG. 5E) may be input to the second machine learning model 522. The second machine learning model 522 may generate the evaluation 536 based upon the evaluation data 534.

In an example, the first prediction may be indicative of the first set of data not being part of the first training data 502 (and/or the first prediction may be indicative of the first set of data being inference data). For example, the first label may be indicative of the second classification (associated with inference data). In some examples, it may be determined that the first set of data (and/or other inference data, such as one or more other sets of inference data of the one or more first sets of inference data and/or at least some of the first plurality of sets of inference data) is incompatible with the first machine learning model 506 based upon the first prediction being indicative of the first set of data not being part of the first training data 502 (e.g., it may be determined that the first set of data (and/or the other inference data) is incompatible with the first machine learning model 506 based upon the first label being indicative of the second classification).

Alternatively and/or additionally, it may be determined that the first set of data (and/or other inference data, such as one or more other sets of inference data of the one or more first sets of inference data and/or at least some of the first plurality of sets of inference data) is incompatible with the first machine learning model 506 based upon the first prediction being indicative of the first set of data not being part of the first training data 502 and based upon a determination that the first confidence score exceeds a threshold confidence score. For example, the first confidence score may be compared with the threshold confidence score to determine whether the first set of data is incompatible with the first machine learning model 506.

Alternatively and/or additionally, it may be determined that the first set of data (and/or other inference data, such as one or more other sets of inference data of the one or more first sets of inference data and/or at least some of the first plurality of sets of inference data) is compatible with the first machine learning model 506 based upon the first prediction being indicative of the first set of data being part of the first training data 502 (e.g., it may be determined that the first set of data (and/or the other inference data) is compatible with the first machine learning model 506 based upon the first label being indicative of the first classification).

Alternatively and/or additionally, it may be determined that the first set of data (and/or other inference data, such as one or more other sets of inference data of the one or more first sets of inference data and/or at least some of the first plurality of sets of inference data) is compatible with the first machine learning model 506 based upon the first prediction being indicative of the first set of data not being part of the first training data 502 and based upon a determination that the first confidence score is less than the threshold confidence score.

In some examples, the one or more first predictions may comprise one or more second predictions indicative of one or more sets of data of the evaluation data 534 not being part of the first training data 502 (and/or the one or more second predictions may be indicative of the one or more sets of data being inference data). For example, one or more labels of the one or more second predictions may be indicative of the second classification (associated with inference data). In some examples, it may be determined that the one or more first sets of inference data (and/or other inference data, such as at least some of the first plurality of sets of inference data) are incompatible with the first machine learning model 506 based upon the one or more second predictions being indicative of the one or more sets of data not being part of the first training data 502 and/or based upon the one or more second predictions meeting a threshold proportion of the one or more first predictions.

In some examples, the one or more first predictions may comprise one or more third predictions indicative of one or more sets of data of the evaluation data 534 not being part of the first training data 502 (and/or the one or more first predictions may be indicative of the one or more sets of data being inference data), where the one or more third predictions each have a confidence score exceeding the threshold confidence score. For example, one or more labels of the one or more third predictions may be indicative of the second classification (associated with inference data). In some examples, it may be determined that the one or more first sets of inference data (and/or other inference data, such as at least some of the first plurality of sets of inference data) are incompatible with the first machine learning model 506 based upon the one or more third predictions being indicative of the one or more sets of data not being part of the first training data 502, based upon the one or more third predictions each having a confidence score exceeding the threshold confidence score, and/or based upon the one or more third predictions meeting the threshold proportion of the one or more first predictions.

Accordingly, one or more incompatible sets of inference data that are determined to be incompatible with the first machine learning model 506 may be identified using one or more of the techniques provided herein. The evaluation 536 may be indicative of the one or more incompatible sets of inference data being incompatible with the first machine learning model 506.

In some examples, one or more first differences between the one or more incompatible sets of inference data and the first training data 502 may be determined. In some examples, the evaluation 536 may be indicative of the one or more first differences. The one or more first differences may be determined using the second machine learning model 522. In some examples, the one or more first differences may comprise one or more differences between one or more features of the one or more incompatible sets of inference data and one or more features of the first training data 502. In some examples, feature scores associated with features of the one or more incompatible sets of inference data and/or the first training data 502 may be determined using the second machine learning model 522 and/or the one or more differences of the one or more first differences may be determined based upon the feature scores. In some examples, a feature score of the feature scores may correspond to a feature importance and/or a weight of a feature. The one or more first differences may be determined based upon the feature scores such that the one or more first differences comprise one or more differences between one or more features of the one or more incompatible sets of inference data and one or more features of the first training data 502, where the one or more features of the one or more incompatible sets of inference data and/or the one or more features of the first training data 502 are associated with one or more feature scores exceeding a threshold feature score. Alternatively and/or additionally, the one or more first differences may comprise one or more differences between one or more types of data of the one or more incompatible sets of inference data and one or more types of data of the first training data 502. Alternatively and/or additionally, the one or more first differences may comprise one or more differences between one or more values of the one or more incompatible sets of inference data and one or more values of the first training data 502. Alternatively and/or additionally, the one or more first differences may comprise one or more differences between one or more sequences of characters and/or values of the one or more incompatible sets of inference data and one or more sequences of characters and/or values of the first training data 502.

In some examples, the one or more first differences may comprise a difference in an amount of null values between sets of data of the first training data 502 and sets of data of the one or more incompatible sets of inference data, a difference in units of measurement between sets of data of the first training data 502 and the one or more incompatible sets of inference data (such as where sets of data of the first training data 502 comprise values corresponding to seconds and/or the one or more incompatible sets of inference data comprise values corresponding to milliseconds), a difference due to a bug in generating the one or more incompatible sets of data and/or a bug in processing information to generate the one or more incompatible sets of data, a difference in frequency of one or more values and/or characters between the sets of data of the first training data 502 and the one or more incompatible sets of inference data, etc.

In some examples, the one or more first differences may comprise one or more differences associated with model drift. In an example in which the first machine learning model 506 is configured and/or trained to determine whether a message is fraudulent, changes in messages over time may result in current fraudulent messages having one or more characteristics different than fraudulent messages associated with the first training data 502 used to train the first machine learning model 506. Accordingly, sets of inference data generated based upon the current fraudulent messages may be incompatible with the first machine learning model 506. In an example in which the first machine learning model 506 is configured and/or trained to determine whether a user is interested in a particular content item based upon a user profile of the user, changes over time in properties associated with at least one of seasonality, changing consumer preferences, the addition of new products, etc., may result in current user profiles having one or more characteristics different than user profiles associated with the first training data 502 used to train the first machine learning model 506. Accordingly, sets of inference data generated based upon the current user profiles may be incompatible with the first machine learning model 506.

In an example where the first training data 502 and/or the one or more incompatible sets of inference data correspond to images, the one or more first differences may comprise at least one of a difference in aspect ratio between images of the first training data 502 and an image of the one or more incompatible sets of inference data, a difference in resolutions between images of the first training data 502 and an image of the one or more incompatible sets of inference data, a difference in contrast and/or lighting (e.g., lighting conditions of a captured image) between images of the first training data 502 and an image of the one or more incompatible sets of inference data, a difference between angles at which images of the first training data 502 are captured and an angle at which an image of the one or more incompatible sets of inference data is captured, a difference in colors of objects between images of the first training data 502 and an image of the one or more incompatible sets of inference data, an image of the one or more incompatible sets of inference data comprising one or more alterations (such as associated with photo manipulation) while images of the first training data 502 do not comprise alterations, an image of the one or more incompatible sets of inference data comprising one or more image artifacts (e.g., visual artifacts, such as at least one of digital artifacts, compression artifacts, etc.), etc.

In an example, the one or more incompatible sets of inference data may comprise a set of data corresponding to encoded text. For example, text (e.g., text of at least one of an article, a transcript, etc.) may be processed (e.g., encoded) to generate the set of data for input to the first machine learning model 506, such as to perform natural language processing using the first machine learning model 506. In some examples, a first encoder used to process (e.g., encode) the text to generate the set of data may be different than a second encoder used to process (e.g., encode) text to generate sets of training data of the first training data 502. Accordingly, the set of data may be incompatible with the first machine learning model 506 due to the first encoder being different than the second encoder. In an example, the first encoder may comprise value "1" corresponding to term "the", value "2" corresponding to term "house", value "3" corresponding to term "is" and/or value "4" corresponding to term "red". However, the second encoder may comprise value "4" corresponding to term "the", value "3" corresponding to term "house", value "2" corresponding to term "is" and/or value "1" corresponding to term "red". Accordingly, a phrase "the house is red" would be encoded into a sequence of values [1, 2, 3, 4] using the first encoder, but would be encoded into a different sequence of values [4, 3, 2, 1] using the second encoder. In some examples, the one or more first differences may comprise a difference between sequences of values of the set of data and sets of data of the first training data 502. Alternatively and/or additionally, the one or more first differences may comprise a difference corresponding to the set of data comprising a value that is not included in sets of data of the first training data 502 (e.g., the first encoder used to generate the set of data may comprise the value and/or the second encoder used to generate sets of data of the first training data 502 may not comprise the value). Alternatively and/or additionally, the one or more first differences may comprise a difference between a frequency and/or prevalence of a value in the set of data and a frequency and/or prevalence of the value in the first training data 502. In an example where the first encoder (associated with the set of data) comprises value "1" corresponding to term "the" and the second encoder (associated with the first training data 502) comprises value "1" corresponding to the term "red", a frequency and/or prevalence of the value "1" in the set of data may be greater than a frequency and/or prevalence of the value "1" in the first training data 502.

In an example, the one or more incompatible sets of inference data may comprise a set of data comprising structured data. For example, the structured data may be indicative of a plurality of features. In some examples, the one or more first differences may comprise a difference between a format of the structured data of the set of data and a format of structured data of sets of data of the first training data 502 (e.g., the set of data may be formatted and/or arranged differently than sets of data of the first training data 502). In an example, information corresponding to a feature of a first type may be included in column n and/or row m of the set of data and/or information corresponding to a feature of the first type may be included in column x and/or row y of sets of data of the first training data 502 (where x is different than n and/or y is different than m). Accordingly, the set of data may be incompatible with the first machine learning model 506 due to the format of the set of data being different than the format of sets of data of the first training data 502.

In an example, the one or more incompatible sets of inference data may comprise a set of data associated with one or more underrepresented entities. For example, the one or more underrepresented entities may correspond to one or more entities that are underrepresented by the first training information, and thus, the first machine learning model 506 may not be able to accurately and/or correctly determine (e.g., predict) information associated with the one or more entities. In an example, the first training information may comprise information associated with one or more entities having characteristics different than the one or more underrepresented entities. For example, the first training information may comprise information (e.g., images, user profiles, etc.) associated with at least one of a first ethnicity, a first race, people having one or more first characteristics, etc., whereas the set of data may comprise information (e.g., an image, a user profile, etc.) associated with at least one of a second ethnicity, a second race, a person having one or more second characteristics, etc. The first training information does not comprise information or comprises less than a threshold amount of information associated with at least one of the second ethnicity, the second race, the one or more second characteristics, etc., and thus, a prediction performed using the first machine learning model 506 based upon the set of data may be invalid, inaccurate and/or incorrect.

Alternatively and/or additionally, one or more first portions, of the one or more incompatible sets of inference data, associated with the one or more first differences may be determined. A portion of the one or more first portions may be a portion of an incompatible set of inference data having a difference, of the one or more first differences, with the first training data 502. In an example, the one or more first differences may comprise a difference corresponding to an image of the incompatible set of inference data comprising an object that is not included in the first training data 502. In the example, a portion of the one or more first portions may be a portion, of the image, comprising the object. In an example, the one or more first differences may comprise a difference between a first column of structured data of the incompatible set of inference data and a column the first training data 502. In the example, a portion of the one or more first portions may comprise the first column.

Alternatively and/or additionally, one or more suggested actions associated with the one or more incompatible sets of inference data and/or the first machine learning model 506 may be determined. The one or more suggested actions may be determined based upon at least one of the one or more incompatible sets of inference data, the first machine learning model 506, the one or more first differences, the one or more first portions, etc. In an example in which the one or more first differences comprise a difference that is a result of using different encoders to generate the one or more incompatible sets of inference data and the first training data, the one or more suggested actions may comprise an action corresponding to using a correct encoder (e.g., an encoder used to generate the first training data 502) to generate one or more replacement sets of inference data of the one or more incompatible sets of inference data, and/or to determine one or more predictions based upon the one or more replacement sets of inference data using the first machine learning model 506. In an example, the one or more suggested actions may comprise an action corresponding to changing a format of structured data of an incompatible set of inference data to match a format of structured data of one or more sets of training data of the first training data 502. In an example, the one or more suggested actions may comprise an action corresponding to changing a resolution of an image of an incompatible set of inference data to match an image resolution of images of the first training data 502. In an example, the one or more suggested actions may comprise an action corresponding to training the first machine learning model 506 using an incompatible set of inference data to generate an updated version of the first machine learning model 506. In an example, the one or more suggested actions may comprise an action corresponding to providing new training data associated with one or more underrepresented entities that are underrepresented by the first training data 502 and/or training the first machine learning model 506 using the new training data to generate an updated version of the first machine learning model 506. In an example, the one or more suggested actions may comprise an action corresponding to checking the one or more first portions for errors and/or issues (such as in light of the one or more first differences). In some examples, one or more actions of the one or more suggested actions may be performed (automatically, for example) in response to determining the one or more suggested actions.

In some examples, one or more actions may be performed (e.g., automatically performed) in response to determining that the one or more incompatible sets of inference data are incompatible with the first machine learning model 506. In an example, one or more predictions associated with the one or more incompatible sets of inference data may be identified. The one or more predictions may be determined using the first machine learning model 506 based upon the one or more incompatible sets of inference data.

In some examples, the one or more actions may comprise removing (e.g., deleting) the one or more predictions from a set of predictions determined using the first machine learning model 506. For example, the set of predictions may comprise predictions determined, using the first machine learning model 506, based upon sets of inference data of the first plurality of sets of inference data.

Alternatively and/or additionally, the one or more actions may comprise flagging the one or more predictions as invalid, such as based upon the one or more predictions being determined based upon data (e.g., the one or more incompatible sets of inference data) that is incompatible with the first machine learning model 506. In some examples, in response to flagging a prediction as invalid, the prediction may not be used for performing an action and/or providing one or more services associated with the first machine learning model 506. For example, in a scenario in which predictions determined using the first machine learning model 506 are used to select content for presentation via client devices, a prediction that is flagged as invalid may not be used to select a content item for presentation via a client device.

Alternatively and/or additionally, the one or more actions may comprise flagging the one or more incompatible sets of inference data as incompatible with the first machine learning model 506. In an example in which the one or more actions are performed prior to using the first machine learning model 506 to determine predictions associated with sets of inference data of the first plurality of sets of inference data, the first machine learning model 506 may not be used to determine one or more predictions associated with the one or more incompatible sets of inference data that are flagged as incompatible with the first machine learning model 506. For example, the first machine learning model 506 may be used to determine predictions associated with sets of inference data, other than the one or more incompatible sets of inference data, of the first plurality of sets of inference data. Alternatively and/or additionally, the one or more actions may comprise removing (e.g., deleting) the one or more incompatible sets of data.

Alternatively and/or additionally, the one or more actions may comprise training the first machine learning model 506 using a set of data of the one or more incompatible sets of data to generate a third machine learning model (e.g., an updated version of the first machine learning model 506). For example, a label associated with the set of data may be determined and/or the first machine learning model 506 may be trained using the set of data and/or the label associated with the set of data to generate the third machine learning model. In some examples, the label may be indicative of a classification or other target information associated with the set of data. In an example in which the label is indicative of a classification, the classification may be a new classification (that is different from classifications indicated by the first plurality of labels) or the classification may be the same as a classification indicated by one or more labels of the first plurality of labels. In some examples, the label may be determined by analyzing the set of data. Alternatively and/or additionally, the label may be determined based upon one or more inputs received from a client device (such as using one or more of the techniques described below).

In some examples, an evaluation report indicative of the evaluation 536 may be generated. For example, the evaluation report may be generated in response to generating the evaluation 536. In some examples, the evaluation report may be indicative of the one or more incompatible sets of inference data being incompatible with the first machine learning model 506. For example, the evaluation report may comprise a representation of the one or more incompatible sets of inference data. Alternatively and/or additionally, the evaluation report may comprise one or more identifiers (e.g., one or more data set identifiers) that identify the one or more incompatible sets of inference data. Alternatively and/or additionally, the evaluation report may be indicative of the one or more first differences between the one or more incompatible sets of inference data and the first training data 502. Alternatively and/or additionally, the evaluation report may be indicative of the one or more first portions associated with the one or more first differences. Alternatively and/or additionally, the evaluation report may be indicative of the one or more suggested actions associated with the one or more incompatible sets of inference data and/or the first machine learning model 506.

In some examples, the evaluation report may be displayed via a client device. In some examples, the client device may be associated with machine learning model management and/or prediction management. The evaluation report may be transmitted (automatically, for example) to the client device and/or displayed via the client device based upon a determination that the one or more incompatible sets of inference data are incompatible with the first machine learning model 506. Alternatively and/or additionally, a notification (e.g., a warning) may be transmitted to the client device and/or displayed via the client device (in response to the determination that the one or more incompatible sets of inference data are incompatible with the first machine learning model 506, for example). The notification may be indicative of the one or more incompatible sets of inference data being incompatible with the first machine learning model 506. In some examples, the notification may comprise the evaluation report.

In some examples, a machine learning model management interface may be displayed via the client device. In an example, the machine learning model management interface may display the evaluation report and/or one or more selectable inputs associated with one or more actions (e.g., one or more actions associated with the one or more incompatible sets of inference data).

In an example, the one or more selectable inputs may comprise a first selectable input associated with training the first machine learning model 506, using a set of data of the one or more incompatible sets of inference data, to generate the third machine learning model (e.g., an updated version of the first machine learning model 506). For example, a selection of the first selectable input may correspond to a request to train the first machine learning model 506, using the set of data, to generate the third machine learning model. In some examples, in response to receiving a selection of the first selectable input, a label associated with the set of data may be determined (automatically, for example) and/or the first machine learning model 506 may be trained using the set of data and/or the label associated with the set of data to generate the third machine learning model. In some examples, the label may be indicative of a classification or other target information associated with the set of data. Alternatively and/or additionally, in response to receiving a selection of the first selectable input, a training interface may be displayed via the client device. One or more inputs associated with training the first machine learning model 506 to generate the third machine learning model may be received via the training interface. In an example, the one or more inputs may comprise the label associated with the set of data and/or one or more training parameters associated with training the first machine learning model 506. The first machine learning model 506 may be trained (to generate the third machine learning model) based upon the set of data, the label associated with the set of data and/or the one or more training parameters. The third machine learning model may be used to determine predictions associated with sets of inference data (after the third machine learning model is generated, for example).

In an example, the one or more selectable inputs may comprise a second selectable input associated with removing (e.g., deleting) one or more predictions, determined using the first machine learning model 506 based upon the one or more incompatible sets of data, from a set of predictions determined using the first machine learning model 506. For example, the one or more predictions may be removed (e.g., deleted) in response to a selection of the second selectable input. Alternatively and/or additionally, the one or more selectable inputs may comprise a third selectable input associated with flagging the one or more predictions as invalid. For example, the one or more predictions may be flagged as invalid in response to a selection of the third selectable input. Alternatively and/or additionally, the one or more selectable inputs may comprise a fourth selectable input associated with flagging the one or more incompatible sets of inference data. For example, the one or more incompatible sets of inference data may be flagged as incompatible with the first machine learning model 506 in response to a selection of the fourth selectable input. Alternatively and/or additionally, the one or more selectable inputs may comprise a fifth selectable input associated with removing (e.g., deleting) the one or more incompatible sets of inference data. For example, the one or more incompatible sets of inference data may be removed (e.g., deleted) in response to a selection of the fifth selectable input.

FIG. 5F illustrates the machine learning model management interface (shown with reference number 550 in FIG. 5F). In some examples, the machine learning model management interface may be displayed via a client device associated with machine learning model management and/or prediction management. The machine learning model management interface 550 may display the evaluation report (shown with reference number 548 in FIG. 5F). In the example of FIG. 5F, the evaluation report 548 is indicative of an incompatible set of inference data corresponding to an image of a strawberry being incompatible with the first machine learning model 506 (such as due to the first machine learning model 506 being trained using the first training data 502 that may not comprise images of strawberries). For example, the first training data 502 used to train and/or generate the first machine learning model 506 may comprise sets of data corresponding to images of bananas and/or oranges (such as shown in FIG. 5B). The evaluation report 548 may comprise the one or more first differences.

In the example of FIG. 5F, the one or more first differences may comprise a difference in color between an object (e.g., strawberry) of the incompatible set of data and objects (e.g., oranges and/or bananas) of the first training data 502. Alternatively and/or additionally, the one or more first differences may comprise a difference in aspect ratio between the image corresponding to the incompatible set of data and images of the first training data 502 (such as where an aspect ratio of the image corresponding to the incompatible set of data is 1:2 and/or an aspect ratio of images of the first training data 502 is 1:1). Alternatively and/or additionally, the one or more first differences may comprise a difference in lighting between the image corresponding to the incompatible set of data and images of the first training data 502 (such as where the image corresponding to the incompatible set of data is captured in different, such as darker, lighting conditions than images of the first training data 502).

In some examples, the machine learning model management interface 550 may display the first selectable input (shown with reference number 552 in FIG. 5F), the second selectable input (shown with reference number 554 in FIG. 5F) and/or the third selectable input (shown with reference number 556 in FIG. 5F). In an example, a selection of the first selectable input 552, associated with training the first machine learning model 506 using the incompatible set of inference data, may be received. In some examples, in response to receiving the selection of the first selectable input 552, a label associated with the incompatible set of inference data may be determined (e.g., automatically determined) based upon the image of the incompatible set of inference data (such as by performing one or more image processing techniques and/or one or more object recognition techniques). In an example, the label may be indicative of a classification (e.g., strawberry) associated with the incompatible set of inference data. Alternatively and/or additionally, in response to receiving the selection of the first selectable input 552 and/or determining the label, the first machine learning model 506 may be trained using the incompatible set of inference data and/or the label to generate the third machine learning model. Alternatively and/or additionally, in response to receiving the selection of the first selectable input 552, the training interface may be displayed. One or more inputs (e.g., one or more inputs indicative of the label and/or one or more training parameters) associated with training the first machine learning model 506 to generate the third machine learning model may be received via the training interface. The first machine learning model 506 may be trained based upon the incompatible set of inference data and/or the one or more inputs to generate the third machine learning model.

FIG. 5G illustrates machine learning model training being performed to generate the third machine learning model (shown with reference number 540 in FIG. 5G). For example, inference data 542 comprising the incompatible set of inference data (shown with reference number 544 in FIG. 5G) and/or the label associated with the incompatible set of inference data (shown with reference number 546 in FIG. 5G) may be input to the machine learning training module 504. The machine learning training module 504 may train the first machine learning model 506 using the inference data 542 to generate the third machine learning model 540.

One or more of the techniques provided herein may be performed periodically (e.g., at least one of once per day, once per week, etc.) to determine whether sets of inference data are incompatible with the first machine learning model 506. Accordingly, in an example in which the first machine learning model 506 is trained and/or updated based upon sets of inference data that are incompatible with the first machine learning model 506, the first machine learning model 506 (and/or updated versions of the first machine learning model 506) may be trained and/or updated periodically, such as to respond to model drift that may occur over time, thereby preventing and/or inhibiting performance degradation of the first machine learning model 506 over time.

One or more of the techniques provided herein may be performed in response to receiving a request to perform an action and/or provide a service. The action and/or the service may be associated with the first machine learning model 506 (e.g., the action may be performed and/or the service may be provided using the first machine learning model 506). In an example, the evaluation data 534 (based upon which the one or more first predictions are determined) comprises a set of inference data associated with the request (e.g., the evaluation data 534 may comprise only the set of inference data or the evaluation data 534 may comprise multiple sets of inference data comprising the set of inference data associated with the request). In an example in which the request is a request for content from a device, the set of inference data may comprise structured data indicative of one or more features corresponding to activity of the device, one or more features corresponding to one or more demographic parameters of a user of the device, one or more features corresponding to one or more content items consumed via the device, one or more features corresponding to one or more internet resources accessed via the device, etc. In some examples, the request may comprise the set of inference data. Alternatively and/or additionally, the request may comprise information and/or the information may be processed to generate the set of inference data associated with the request. Alternatively and/or additionally, the set of inference data may be generated based upon a user profile associated with the client device (e.g., the set of inference data may be generated in response to receiving the request).

In some examples, prior to using the first machine learning model 506 to determine first information (e.g., a prediction) based upon the set of inference data (e.g., the first information may correspond to information based upon which the action may be performed and/or the service may be provided), the second machine learning model 522 may be used to determine whether the set of inference data is compatible with the first machine learning model 506. In some examples, in response to determining that the set of inference data is incompatible with the first machine learning model 506 (using one or more of the techniques provided herein, for example), the set of inference data may be removed and/or flagged and/or the first machine learning model 506 may not be used to determine the first information based upon the set of inference data. Alternatively and/or additionally, in response to determining that the set of inference data is incompatible with the first machine learning model 506, the action and/or the service associated with the request may be performed using other information (and/or the action and/or the service may not be performed). Alternatively and/or additionally, in response to determining that the set of inference data is compatible with the first machine learning model 506 (using one or more of the techniques provided herein, for example), the first machine learning model 506 may be used to determine the first information and/or the action and/or the service associated with the request may be performed using the first information.

Alternatively and/or additionally, the second machine learning model 522 may be used to determine whether the set of inference data is compatible with the first machine learning model 506 after determining the first information (e.g., the prediction), using the first machine learning model 506, based upon the set of inference data. In some examples, in response to determining that the set of inference data is incompatible with the first machine learning model 506 (using one or more of the techniques provided herein, for example), the first information and/or the set of inference data may be removed and/or flagged. Alternatively and/or additionally, in response to determining that the set of inference data is incompatible with the first machine learning model 506, the action and/or the service associated with the request may be performed using other information (and/or the action and/or the service may not be performed). Alternatively and/or additionally, in response to determining that the set of inference data is compatible with the first machine learning model 506 (using one or more of the techniques provided herein, for example), the action and/or the service associated with the request may be performed using the first information.

In some examples, one or more of the techniques provided herein may be performed within a mobile edge computing network architecture and/or a multi-access edge computing (MEC) network architecture. One or more computing programs and/or data associated with performing one or more of the techniques provided herein may be deployed at a network node, such as a cellular base station and/or a different edge node. In an example, the network node may be connected (e.g., directly connected and/or indirectly connected) to one or more devices. The network node may provide cellular coverage to the one or more devices within a coverage area of the network node. The network node may be closer to the one or more devices than a core network. At least one of generating the first inference-training data 520, performing machine learning model training to generate the second machine learning model 522, receiving one or more sets of inference data from a device of the one or more devices, generating an evaluation of the first machine learning model 506 and/or the one or more sets of inference data using the second machine learning model 522, etc. may be performed using a computer system at the network node. In an example, the first machine learning model 506 may be used by the computer system at the network node to provide one or more services to the one or more devices. In an example, a set of inference data may be received from a device of the one or more devices. In response to receiving the set of inference data, the second machine learning model 522 may be used (by the computer system, for example) to determine whether the set of inference data is incompatible with the first machine learning model 506 (such as using one or more of the techniques provided herein, such as by determining a prediction of whether the set of inference data is part of the first training data 502 using the second machine learning model 522). In some examples, in response to determining that the set of inference data is compatible with the first machine learning model 506, a prediction associated with the set of inference data may be determined using the first machine learning model 506 and/or one or more services may be provided to the device based upon the prediction. Alternatively and/or additionally, in response to determining that the set of inference data is incompatible with the first machine learning model 506, the computer system may perform one or more actions discussed herein (such as at least one of flagging the set of inference data, training the first machine learning model 506 using the set of inference data to generate an updated version of the first machine learning model 506, etc.).

Implementation of at least some of the disclosed subject matter may lead to benefits including, but not limited to, a reduction in resources required to evaluate (and/or update) a machine learning model and/or inference data to be input to the machine learning model. For example, some systems require human input and/or manual effort to at least one of evaluate the machine learning model and/or the inference data, determine whether the inference data is compatible with the machine learning model, etc. Other systems require labels for the inference data, which may be expensive to obtain. However, using one or more of the techniques provided herein, the machine learning model and/or the inference data may be evaluated, a compatibility of the inference data with the machine learning model may be determined, and/or an evaluation report associated with an incompatible set of inference data may be generated and/or displayed automatically (such as without requiring human input, manual effort, and/or expenses associated with some systems).

Alternatively and/or additionally, implementation of the disclosed subject matter may lead to benefits including an increase in quality and/or accuracy of information determined using the first machine learning model 506 based upon one or more sets of inference data. In some examples, the increase in quality and/or accuracy may be a result of determining whether the one or more sets of inference data are compatible with the first machine learning model 506, and/or as a result of training and/or updating the first machine learning model 506 using an incompatible set of inference data to generate an updated version of the first machine learning model 506. Alternatively and/or additionally, the increase in quality and/or accuracy may be a result of training and/or updating the first machine learning model 506 (and/or updated versions of the first machine learning model 506) periodically, such as to respond to model drift that may occur over time, thereby preventing and/or inhibiting performance degradation of the first machine learning model 506 over time. Alternatively and/or additionally, the increase in quality and/or accuracy may be a result of transmitting and/or displaying the notification and/or the evaluation report to a client device, where the notification and/or the evaluation report may be indicative of the one or more first differences, the one or more first portions and/or the one or more suggested actions, thus enabling machine learning model management and/or prediction management to more quickly identify and/or correct issues associated with at least one of inference data, processing of information to generate the inference data (such as a feature engineering pipeline that uses an encoder to generate inference data that is different than an encoder used to generate the first training data) and/or the first machine learning model 506.

Alternatively and/or additionally, implementation of the disclosed subject matter may lead to benefits including an increase in quality of actions performed and/or services provided using the first machine learning model 506 based upon one or more sets of inference data (e.g., as a result of the increase in quality and/or accuracy of information determined using the first machine learning model 506, as a result of flagging and/or removing a set of data determined to be incompatible with the first machine learning model 506, as a result of flagging and/or removing a prediction determined using the first machine learning model 506 based upon the set of data determined to be incompatible with the first machine learning model 506, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
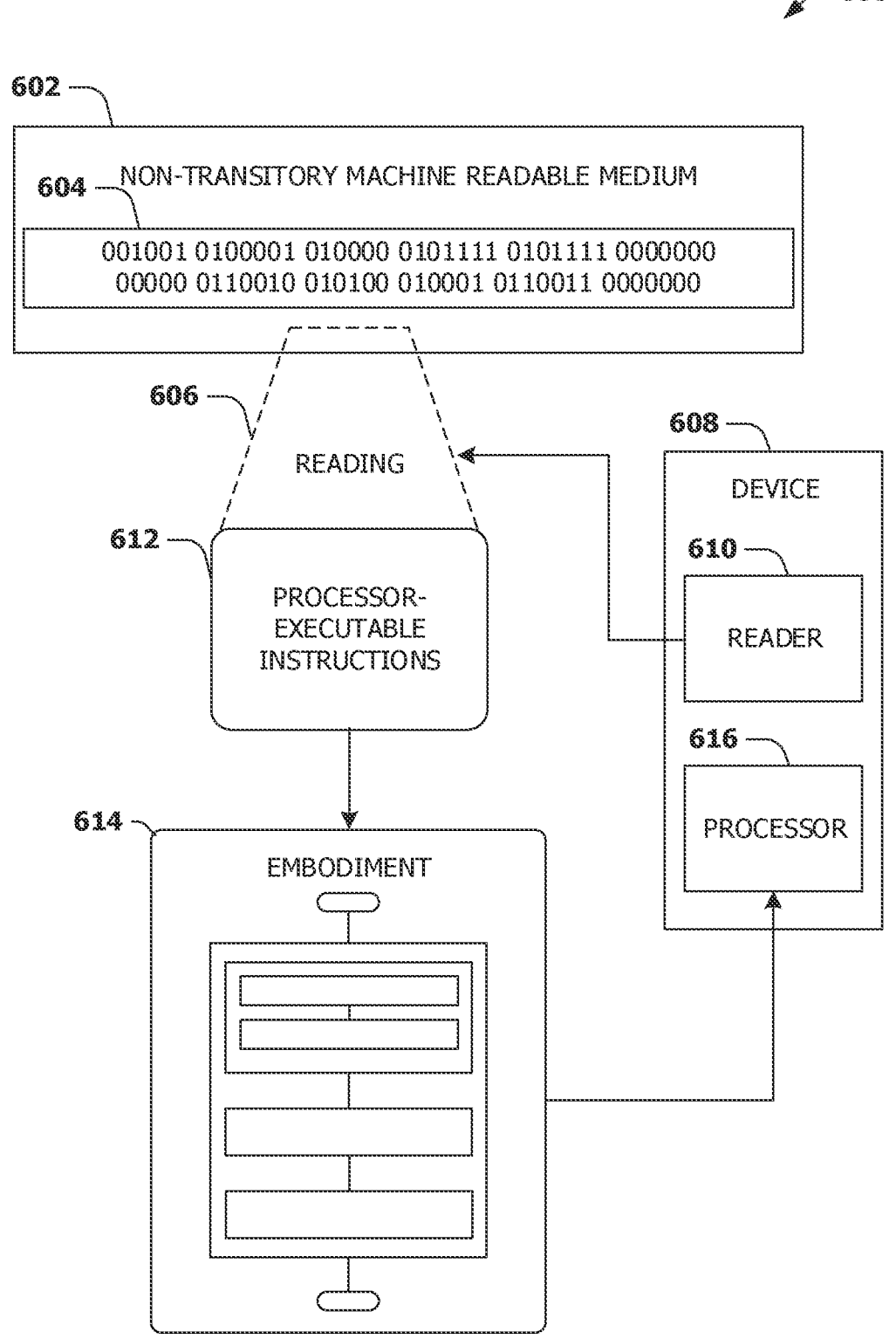
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

performing machine learning model training using first training data to generate a first machine learning model, wherein the first training data comprises a first plurality of sets of training data and a first plurality of labels associated with the first plurality of sets of training data;

identifying a first plurality of sets of inference data based upon which the first machine learning model is configured to determine information;

generating, based upon the first training data and the first plurality of sets of inference data, first inference-training data comprising a second plurality of sets of data and a second plurality of labels, wherein:

the second plurality of sets of data comprises:

a second plurality of sets of training data of the first plurality of sets of training data; and a second plurality of sets of inference data of the first plurality of sets of inference data; and the second plurality of labels comprises:

a third plurality of labels associated with the second plurality of sets of training data, wherein the third plurality of labels indicate that a corresponding data set originated from the first plurality of sets of training data and correspond to a first classification; and a fourth plurality of labels associated with the second plurality of sets of inference data, wherein the fourth plurality of labels indicate that a corresponding data set originated from the first plurality of sets of inference data and correspond to a second classification;

performing machine learning model training using the first inference-training data to generate a second machine learning model;

determining, using the second machine learning model, one or more first predictions associated with one or more first sets of data, wherein each prediction of the one or more first predictions is a prediction of whether a set of data of the one or more first sets of data originated from the first plurality of sets of training data or the first plurality of sets of inference data;

generating, based upon the one or more first predictions, a per-dataset evaluation of the first machine learning model and the one or more first sets of data, wherein generating the per-dataset evaluation comprises determining one or more differences, associated with incompatibility, between a first set of data and the first training data, wherein the one or more differences comprise at least one of a difference between a first aspect ratio associated with the first set of data and a second aspect ratio associated with the first training data, a difference between a first resolution associated with the first set of data and a second resolution associated with the first training data, a difference between a first contrast associated with the first set of data and a second contrast associated with the first training data, a difference between a first lighting associated with the first set of data and a second lighting associated with the first training data, a difference between a first angle associated with the first set of data and a second angle associated with the first training data, a difference between a first color associated with the first set of data and a second color associated with the first training data, a difference between a first amount of alterations associated with the first set of data and a second amount of alterations associated with the first training data or a difference between a first amount of image artifacts associated with the first set of data and a second amount of image artifacts associated with the first training data;

displaying at least some of the per-dataset evaluation, comprising at least some of the one or more differences, with a plurality of selectable inputs, each associated with a corresponding prediction for a corresponding data item, comprising at least two of a first selectable input associated with training the first machine learning model using the first set of data, a second selectable input associated with removing one or more predictions determined based upon the first set of data, a third selectable input associated with flagging the one or more predictions, a fourth selectable input associated with flagging the first set of data, or a fifth selectable input associated with removing the first set of data; and responsive to receiving one or more selections of the plurality of selectable inputs, at least one of training or updating the first machine learning model to generate a third machine learning model.

2. The method of claim 1, wherein a first prediction of the one or more first predictions is indicative of the first set of data not being part of the first training data, the method comprising:

determining that the first set of data is incompatible with the first machine learning model based upon the first prediction being indicative of the first set of data not being part of the first training data, wherein the per-dataset evaluation is indicative of the first set of data being incompatible with the first machine learning model.

3. The method of claim 1, wherein a first prediction of the one or more first predictions is indicative of the first set of data not being part of the first training data, the method comprising:

determining that the first set of data is incompatible with the first machine learning model based upon the first prediction being indicative of the first set of data not being part of the first training data and a confidence score of the first prediction exceeding a threshold confidence score, wherein the per-dataset evaluation is indicative of the first set of data being incompatible with the first machine learning model.

4. The method of claim 2, comprising:

determining, using the first machine learning model, a second prediction based upon the first set of data; and responsive to the determining that the first set of data is incompatible with the first machine learning model, at least one of:

removing the second prediction from a set of predictions determined using the first machine learning model; or flagging the second prediction as invalid.

5. The method of claim 1, comprising:

selecting the second plurality of sets of inference data, from the first plurality of sets of inference data, for inclusion in the first inference-training data, wherein:

the first plurality of sets of inference data comprises a third plurality of sets of inference data separate from the second plurality of sets of inference data; and the third plurality of sets of inference data comprises one or more second sets of data of the one or more first sets of data.

6. The method of claim 5, wherein:

the selecting the second plurality of sets of inference data from the first plurality of sets of inference data is performed randomly.

7. The method of claim 5, comprising:

selecting the second plurality of sets of training data from the first plurality of sets of training data for inclusion in the first inference-training data, wherein:

the first plurality of sets of training data comprises a third plurality of sets of training data separate from the second plurality of sets of training data; and the third plurality of sets of training data comprises one or more third sets of data of the one or more first sets of data.

8. A computing device comprising:

a processor; and memory comprising processor-executable instructions that when executed by the processor cause performance of operations, the operations comprising:

performing machine learning model training using first training data to generate a first machine learning model, wherein the first training data comprises a first plurality of sets of training data;

identifying a first plurality of sets of inference data;

generating, based upon the first training data and the first plurality of sets of inference data, first inference-training data, wherein the first inference-training data comprises:

a second plurality of sets of data comprising:

a second plurality of sets of training data of the first plurality of sets of training data; and a second plurality of sets of inference data of the first plurality of sets of inference data; and target information indicative of the second plurality of sets of training data originating from the first plurality of sets of training data and being associated with a first classification and the second plurality of sets of inference data originating from the second plurality of sets of training data and being associated with a second classification;

performing machine learning model training using the first inference-training data to generate a second machine learning model;

determining, using the second machine learning model, one or more first predictions associated with one or more first sets of data, wherein each prediction of the one or more first predictions is a prediction of whether a set of data of the one or more first sets of data originated from the first plurality of sets of training data or the first plurality of sets of inference data;

generating, based upon the one or more first predictions, an evaluation of the first machine learning model and the one or more first sets of data, wherein generating the evaluation comprises determining one or more differences, associated with incompatibility, between a first set of data and the first training data, wherein the one or more differences comprise at least one of a difference between a first aspect ratio associated with the first set of data and a second aspect ratio associated with the first training data, a difference between a first resolution associated with the first set of data and a second resolution associated with the first training data, a difference between a first contrast associated with the first set of data and a second contrast associated with the first training data, a difference between a first lighting associated with the first set of data and a second lighting associated with the first training data, a difference between a first angle associated with the first set of data and a second angle associated with the first training data, a difference between a first color associated with the first set of data and a second color associated with the first training data, a difference between a first amount of alterations associated with the first set of data and a second amount of alterations associated with the first training data or a difference between a first amount of image artifacts associated with the first set of data and a second amount of image artifacts associated with the first training data;

displaying at least some of the evaluation, comprising at least some of the one or more differences, with a plurality of selectable inputs comprising at least two of a first selectable input associated with training the first machine learning model using the first set of data, a second selectable input associated with removing one or more predictions determined based upon the first set of data, a third selectable input associated with flagging the one or more predictions, a fourth selectable input associated with flagging the first set of data, or a fifth selectable input associated with removing the first set of data; and responsive to receiving one or more selections of the plurality of selectable inputs, at least one of training or updating the first machine learning model to generate a third machine learning model.

9. The computing device of claim 8, wherein a first prediction of the one or more first predictions is indicative of the first set of data not being part of the first training data, the operations comprising:

determining that the first set of data is incompatible with the first machine learning model based upon the first prediction being indicative of the first set of data not being part of the first training data, wherein the evaluation is indicative of the first set of data being incompatible with the first machine learning model.

10. The computing device of claim 8, wherein a first prediction of the one or more first predictions is indicative of the first set of data not being part of the first training data, the operations comprising:

determining that the first set of data is incompatible with the first machine learning model based upon the first prediction being indicative of the first set of data not being part of the first training data and a confidence score of the first prediction exceeding a threshold confidence score, wherein the evaluation is indicative of the first set of data being incompatible with the first machine learning model.

11. The computing device of claim 9, the operations comprising:

determining, using the first machine learning model, a second prediction based upon the first set of data; and responsive to the determining that the first set of data is incompatible with the first machine learning model, at least one of:

removing the second prediction from a set of predictions determined using the first machine learning model; or flagging the second prediction as invalid.

12. A non-transitory machine-readable medium having stored thereon processor-executable instructions that when executed cause performance of operations, the operations comprising:

performing machine learning model training using first training data to generate a first machine learning model, wherein the first training data comprises a first plurality of sets of training data and a first plurality of labels associated with the first plurality of sets of training data;

identifying a first plurality of sets of inference data based upon which the first machine learning model is configured to determine information;

generating, based upon the first training data and the first plurality of sets of inference data, first inference-training data comprising a second plurality of sets of data and a second plurality of labels, wherein:

the second plurality of sets of data comprises:

a second plurality of sets of training data of the first plurality of sets of training data; and a second plurality of sets of inference data of the first plurality of sets of inference data; and the second plurality of labels comprises:

a third plurality of labels associated with the second plurality of sets of training data, wherein the third plurality of labels indicate that a corresponding data set originated from the first plurality of sets of training data and correspond to a first classification; and a fourth plurality of labels associated with the second plurality of sets of inference data, wherein the fourth plurality of labels indicate that a corresponding data set originated from the first plurality of sets of inference data and correspond to a second classification;

performing machine learning model training using the first inference-training data to generate a second machine learning model;

determining, using the second machine learning model, one or more first predictions associated with one or more first sets of data, wherein each prediction of the one or more first predictions is a prediction of whether a set of data of the one or more first sets of data originated from the first plurality of sets of training data or the first plurality of sets of inference data;

generating, based upon the one or more first predictions, an evaluation of the first machine learning model and the one or more first sets of data, wherein generating the evaluation comprises determining one or more differences, associated with incompatibility, between a first set of data and the first training data, wherein the one or more differences comprise at least one of a difference between a first aspect ratio associated with the first set of data and a second aspect ratio associated with the first training data, a difference between a first resolution associated with the first set of data and a second resolution associated with the first training data, a difference between a first contrast associated with the first set of data and a second contrast associated with the first training data, a difference between a first lighting associated with the first set of data and a second lighting associated with the first training data, a difference between a first angle associated with the first set of data and a second angle associated with the first training data, a difference between a first color associated with the first set of data and a second color associated with the first training data, a difference between a first amount of alterations associated with the first set of data and a second amount of alterations associated with the first training data or a difference between a first amount of image artifacts associated with the first set of data and a second amount of image artifacts associated with the first training data;

displaying at least some of the evaluation, comprising at least some of the one or more differences, with a plurality of selectable inputs comprising at least two of a first selectable input associated with training the first machine learning model using the first set of data, a second selectable input associated with removing one or more predictions determined based upon the first set of data, a third selectable input associated with flagging the one or more predictions, a fourth selectable input associated with flagging the first set of data, or a fifth selectable input associated with removing the first set of data; and responsive to receiving one or more selections of the plurality of selectable inputs, at least one of training or updating the first machine learning model to generate a third machine learning model.

13. The non-transitory machine-readable medium of claim 12, wherein the one or more differences comprise the difference between the first aspect ratio associated with the first set of data and the second aspect ratio associated with the first training data.

14. The non-transitory machine-readable medium of claim 12, wherein the one or more differences comprise the difference between the first resolution associated with the first set of data and the second resolution associated with the first training data.

15. The non-transitory machine-readable medium of claim 12, wherein the one or more differences comprise the difference between the first contrast associated with the first set of data and the second contrast associated with the first training data.

16. The non-transitory machine-readable medium of claim 12, wherein the one or more differences comprise the difference between the first lighting associated with the first set of data and the second lighting associated with the first training data.

17. The non-transitory machine-readable medium of claim 12, wherein the one or more differences comprise the difference between the first angle associated with the first set of data and the second angle associated with the first training data.

18. The non-transitory machine-readable medium of claim 12, wherein the one or more differences comprise the difference between the first color associated with the first set of data and the second color associated with the first training data.

19. The non-transitory machine-readable medium of claim 12, wherein the one or more differences comprise the difference between the first amount of alterations associated with the first set of data and the second amount of alterations associated with the first training data.

20. The non-transitory machine-readable medium of claim 12, wherein the one or more differences comprise the difference between the first amount of image artifacts associated with the first set of data and the second amount of image artifacts associated with the first training data.

* * * * *